United States Patent
Burk et al.

(10) Patent No.: US 11,133,666 B2
(45) Date of Patent: Sep. 28, 2021

(54) SYSTEM AND METHOD FOR MANAGING POWER CONSUMPTION DURING A FAULT CONDITION

(71) Applicant: Current Lighting Solutions, LLC, East Cleveland, OH (US)

(72) Inventors: Jessica Lynn Burk, East Cleveland, OH (US); Carre Denise Scheidegger, East Cleveland, OH (US); Jeffrey Glenn Felty, East Cleveland, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 275 days.

(21) Appl. No.: 16/049,885

(22) Filed: Jul. 31, 2018

(65) Prior Publication Data

US 2019/0181629 A1    Jun. 13, 2019

Related U.S. Application Data

(60) Provisional application No. 62/595,741, filed on Dec. 7, 2017.

(51) Int. Cl.
| | |
|---|---|
| *H02H 9/02* | (2006.01) |
| *H02H 3/02* | (2006.01) |
| *H02H 3/05* | (2006.01) |
| *H02H 3/06* | (2006.01) |
| *H02H 1/00* | (2006.01) |
| *H05B 47/105* | (2020.01) |
| *H05B 45/56* | (2020.01) |

(52) U.S. Cl.
CPC ............ *H02H 9/02* (2013.01); *H02H 1/0007* (2013.01); *H02H 3/025* (2013.01); *H02H 3/05* (2013.01); *H02H 3/066* (2013.01); *H05B 45/56* (2020.01); *H05B 47/105* (2020.01)

(58) Field of Classification Search
CPC ........ H02H 1/0007; H02H 3/025; H02H 3/05; H02H 3/066; H02H 9/02; H05B 33/089; H05B 33/093; H05B 45/00; H05B 45/50; H05B 47/105
See application file for complete search history.

(56) References Cited

U.S. PATENT DOCUMENTS

| | | |
|---|---|---|
| 2017/0064875 A1 | 3/2017 | Casey et al. |
| 2017/0179758 A1 | 6/2017 | Kruiskamp |

FOREIGN PATENT DOCUMENTS

| | | |
|---|---|---|
| EP | 1 306 958 B1 | 11/2016 |
| JP | H10-14131 A | 1/1998 |
| JP | 2000-092699 A | 3/2000 |

OTHER PUBLICATIONS

International Search Report and Written Opinion issued in connection with corresponding PCT Application No. PCT/US2018/059612 dated Feb. 25, 2019.

*Primary Examiner* — Alex Torres-Rivera
*Assistant Examiner* — David A. Singh
(74) *Attorney, Agent, or Firm* — Buckley, Maschoff & Talwalkar LLC

(57) ABSTRACT

A system for limiting power consumption from an auxiliary power supply is provided with a controller configured to toggle a switching circuit in accordance with an output of a sensing module and a time threshold, to sequentially cause the auxiliary power supply to be disconnected from an output terminal when the time threshold is reached and connected to the output terminal when a fault condition in the system is identified.

18 Claims, 4 Drawing Sheets

SYSTEM AND METHOD FOR MANAGING POWER CONSUMPTION DURING A FAULT CONDITION

TECHNICAL FIELD

The present disclosure relates to managing power consumption in circuit and system modules. More particularly, the present disclosure relates to methods and systems for managing power consumption during a fault condition.

BACKGROUND

Auxiliary power supplies may be used in a wide variety of applications. These circuit modules may provide backup power in case a main power supply fails or when a load that requires additional power is connected to a system serviced by the auxiliary power supply and a main power supply.

For example, an auxiliary power supply may be used with a driver of a light emitting diode (LED) lighting system. In this application, the auxiliary power supply is configured to deliver a specified amount of power to a load (e.g. an LED bank) connected to one or more control leads of the driver. However, in many LED lighting systems, these same control leads are also used to communicate instructions to one or more circuit modules of the lighting system. In some example configurations, the communication protocol used may be a digital communication protocol where information is transmitted in digital bits.

From an operational perspective, a digital 0 on a lead, or on two or more leads, corresponds to a short circuit. In other words, and generally, patterns inherent to the communication protocol may be manifested as electrical faults on the control leads. For example, one such protocol is the Digital Addressable Lighting Interface (DALI) protocol, where the transmission of a digital 0 is operationally manifested as a short circuit on two control leads. This short circuit lasts for a predetermined period of time that is inherent to the protocol and, the predetermined time period's expiry indicates the end of the digital 0 in an instruction word. By way of example, and not by limitation, in a communication protocol, the inherent short circuit time may be about 100 milliseconds (ms), or about 50 ms.

In typical systems where such protocols are used and an auxiliary power supply is used, when a fault, e.g. a short circuit, occurs on one or more control leads, it is not possible to distinguish whether the fault is inherent to the communication protocol or if it is due to an adverse event, such as a power surge. In the latter case, for typical systems, power delivery to the load may continue unimpeded even when the fault is due to the adverse event. This may lead to long term damage in one or more modules of the system and/or the load.

SUMMARY

The present disclosure teaches methods, systems, and apparatuses that help mitigate the aforementioned issues. For example, one exemplary embodiment is a system for limiting power consumption from an auxiliary power supply. The system may include a switching circuit connected to an auxiliary power supply and an output terminal. The system may further include a sensing module configured to identify a condition in the system and a controller that is configured to toggle the switching circuit in accordance with an output of the sensing module and a time threshold.

Another exemplary embodiment is a method that may be executed by the above-mentioned system. For example, the method may be used to limit power consumption from an auxiliary power supply during a long-term electrical fault condition. The method may include detecting an electrical fault condition on a control lead. The method may further include disabling the auxiliary power supply when the electrical fault condition remains for a first length of time. The method includes enabling the auxiliary power supply after a second length of time and verifying a presence of the electrical fault condition. The method may include instructing a system to keep the auxiliary power supply enabled when the electrical fault condition is no longer detected.

Another embodiment can be a method for automatically restoring a system's auxiliary power supply upon a resolution of a long-term electrical fault condition. The method may include detecting a long-term electrical fault condition and cycling the auxiliary power supply periodically during the long-term electrical fault condition. The period of the cycling may be a predetermined value. Furthermore, the method can include ceasing the cycling once the long-term fault condition is no longer detected, such that the auxiliary power supply remains in an enabled state.

Another embodiment may be a system for limiting power consumption from an auxiliary power supply by a load. The system may include a processor and a memory that includes instructions, which when executed by the processor, cause the processor to perform certain operations. The operations can include identifying a fault in the system and monitoring a duration of the fault. Furthermore, the operations may include in response to the duration exceeding a threshold, instructing a controller to toggle a switching unit connecting the auxiliary power supply to the load.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

In the example embodiments discussed herein, there is provided an auxiliary power supply configured to sustain "short-term" faults that enable digital communication. While the embodiments are described herein in the context of a driver for an LED lighting system, one of ordinary skill in the art will readily recognize that featured teachings are applicable to other types of system that use auxiliary power supplies and digital communication protocols on one or more control leads.

In the event of an intentional or non-intentional fault condition such as, for example, a "long-term short circuit of control leads", an LED driver must be able to recover all of its outputs without cycling the power to the input of the driver. An example of a long term short circuit would be the shorting of the control leads by relay to indicate an emergency situation. During such long term short circuits conditions, the thermal ratings of the components of the driver or the load might be exceeded and permanent damage may ensue.

The disclosed embodiments allow a driver to respond to the indication of an emergency situation over the control leads, reduce the power consumption of the driver, increase the driver's reliability and recover from the emergency situation without a power cycle to the input leads of the driver. In accordance to one embodiment, this is achieved by periodically turning off the internal auxiliary power supply in order to prevent the thermal ratings from being exceeded. An exemplary implementation of this method is illustrated in FIG. 1 and described in detail hereinafter.

Figure 1:
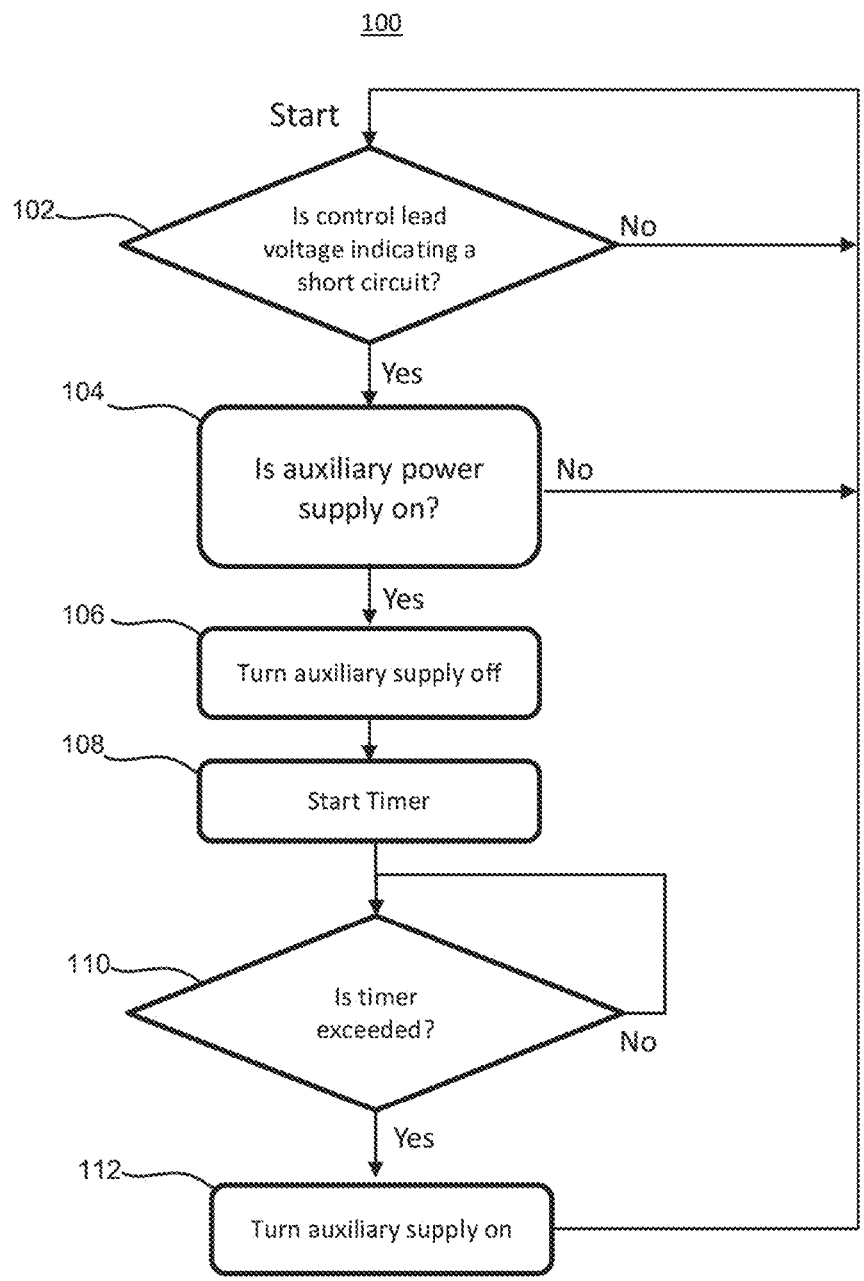
FIG. 1 illustrates a flowchart of a method for limiting power consumption from an auxiliary power supply in accordance with several aspects described herein.

FIG. 1 illustrates a flow chart of an exemplary method 100 that may be used for limiting power consumption during a long-term short circuit from an auxiliary power supply while also enabling auto-recovery once the short circuit has subsided. The method 100 is initiated at step 102 by monitoring a voltage level on one or more external or internal control leads that are connected to one or more load circuitries. A low voltage may be indicative of a short circuit condition on the external or internal control leads. To decide whether the measured voltage is a short circuit it may be compared with a threshold under which a voltage is classified as a short circuit and over which a measured voltage is classified as not being a short circuit. Other means of classifying a short circuit may be implemented without departing from the scope of the present disclosure.

If at step 102 no short circuit condition is detected, the method 100 moves to step 112 to ensure that the auxiliary power supply is switched on, i.e., a switching system is activated to allow the delivery of auxiliary power. If the verification action at step 102 indicates a long-term short circuit condition on one or more external or internal control leads, and a subsequent verification of the auxiliary power supply in step 104 indicates that auxiliary power supply is on, the execution moves onto step 106 where the auxiliary power supply is turned off, or equivalently the delivery of auxiliary power to the system is interrupted. Following step 106 the execution moves onto step 108 wherein a timer is started.

The value of the timer, which was initiated in step 108, is repeatedly monitored relative to a specific threshold value in step 110. When the timer value exceeds the specific threshold, the method 100 moves to step 112 wherein the auxiliary power supply is switched on and the method moves back to step 102.

The method 100 may then move onto step 112 and persist thereupon if the fault condition, such as, for example a long term short circuit, has been removed, or it may continue to step 104 if the indication at step 102 with regards to the fault condition is affirmative. The procedure is repeated, as described and illustrated in FIG. 1, for the duration of the long-term short circuit condition. Classification of a short circuit as a short-term versus a long-term short-circuit may be made using the timer and comparing its run time with a time threshold that represents the inherent short circuit time mandated by a digital protocol used by the system.

Further, the verification of a fault condition, such as a long-term short circuit condition may include a response from a sensing unit, such as a sensor, or it may involve monitoring a signal level on a local port of a controller unit that may be electrically coupled to one or more external or internal control leads.

Figure 2:
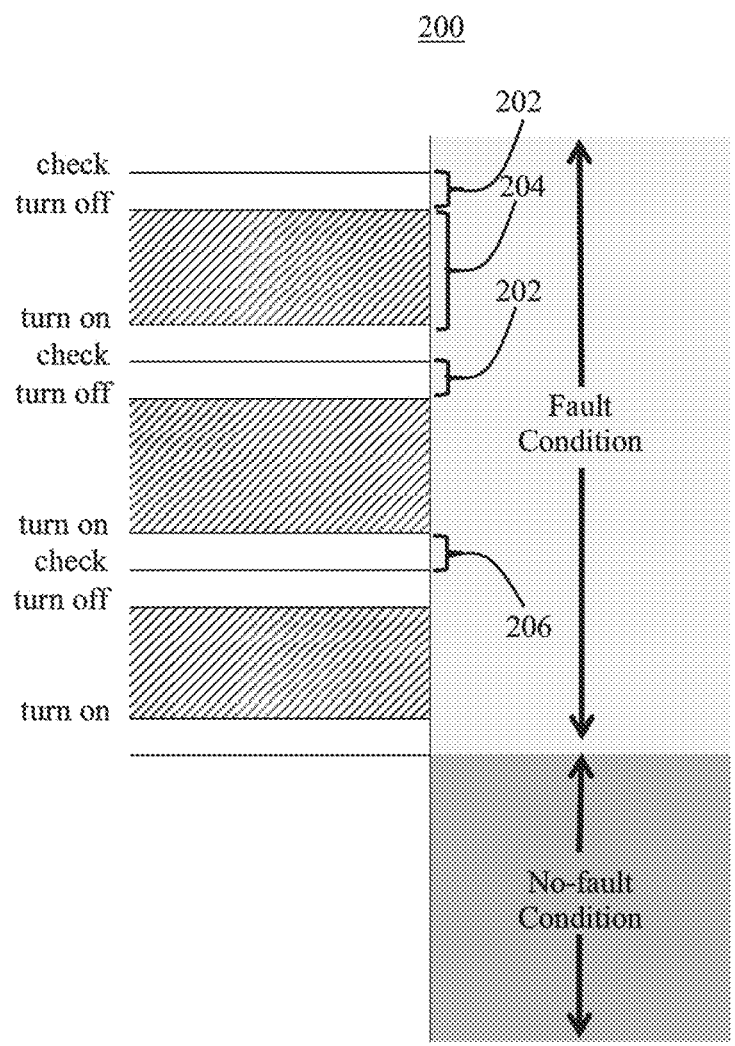
FIG. 2 illustrates an operational timing diagram for switching or cycling an auxiliary power supply in accordance with several aspects described herein.

FIG. 2 depicts a timing diagram 200 for the operation of a controller unit in driving the duty cycle of the auxiliary power supply during a long-term short circuit condition, where the controller is configured to limit power consumption and thermal loading, and to enable auto-recovery once the long-term short circuit condition is removed. The detection of a long-term short circuit condition by a sensing unit or a controller sensing port coupled to one or more control leads, initiates a shutdown of, or an interruption in the delivery of, auxiliary power.

In the timing diagram 200, the time interval 202 represents hardware electronic switching time and/or software processing time involved in the execution of controller instructions for interrupting a flow of the auxiliary power to one or more intended targets. The time interval 204 represent the wait time, or off time, during which the auxiliary power shut off condition is maintained by the controller.

The wait time may be statically programmed into the controller unit or dynamically determined in accordance to one or more parameters that may be hardwired, sensed and/or computationally derived by the controller. The time interval 206 represents hardware electronic switching time and/or software processing time involved in verifying the status of the fault condition after resumption of the auxiliary power delivery initiated at the end of the wait time.

Time Intervals 202 and 206 together represent the duration of the on portion of the auxiliary power duty cycle. This period may be as short as processing speed of the system allows, which in many instances may be operationally negligible relative to the time interval 204, which represents the off portion of the auxiliary power supply duty cycle.

Figure 3:
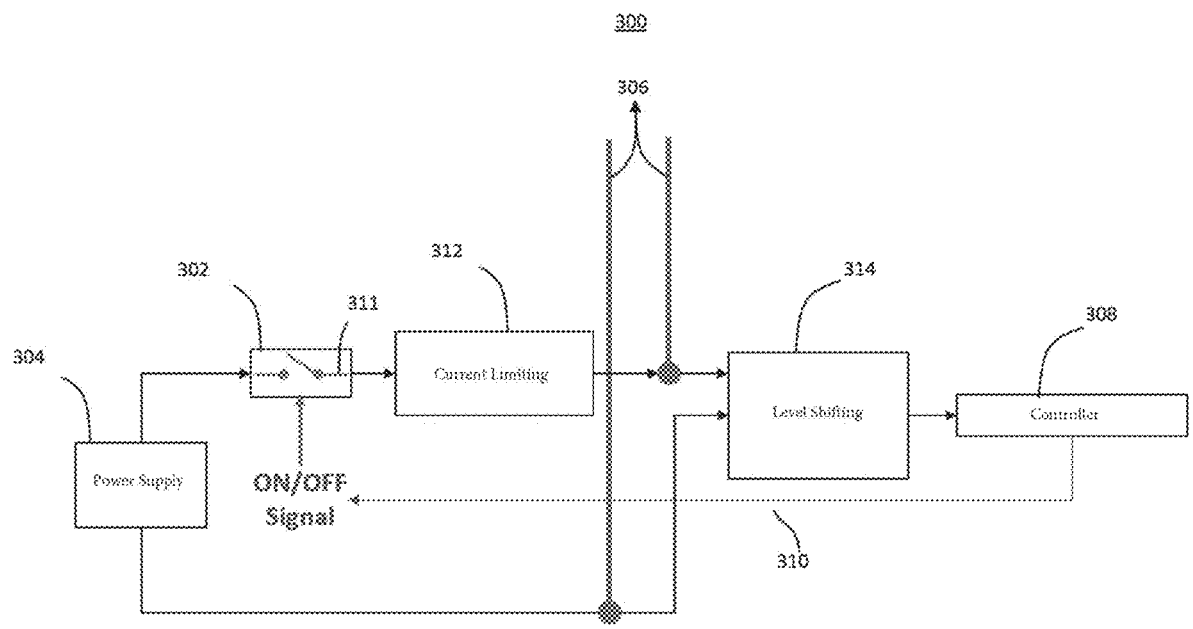
FIG. 3 illustrates a block diagram of an auxiliary power delivery controller in accordance with several aspects described herein.

FIG. 3 illustrates an exemplary system 300 for limiting power consumption during a fault condition. The system 300 is a control system configured to enable auto-recovery of an auxiliary power supply (i.e., automatic resumption of auxiliary power deliver) once a fault condition has been resolved. The system 300 includes a switching circuit 302 for switchably connecting an auxiliary power supply unit 304 to a load circuitry and/or supporting electronics.

The load circuitry may be connected to the control leads 306, which may be internal or external to the auxiliary power supply unit 304. The system 300 further includes a controller 308 in communication with the switching circuit 302. The controller 308 transmits an ON/OFF control signal 310 to the switching circuit 302 in order to control the operation of the switching circuit 302 in accordance with the method 100 and the timing diagram.

In one example, the action of the controller 308 on the switching circuit 302, in context of a driver's operation, may be triggered in response to an indication of an emergency situation having been detected over the external control leads 306. This action is directed at reducing the power consumption of the driver, increasing the driver's reliability and providing a recovery mechanism from the emergency situation without a power cycle to the input leads of the driver.

By way of example, and not by limitation, an indication of an emergency situation may correspond to the presence of a long-term short circuit condition on the external control leads 306. The auxiliary power supply unit 304, as part of a larger driver assembly, is configured to be able to deliver a specified amount of power to a load connected to the control leads 306.

The auxiliary power supply unit 304 is configured to sustain short term short circuits to enable digital communication. In the event of an intentional or non-intentional long-term short circuit the thermal ratings of the components of the driver might be exceeded if the average power supplied to the system is not reduced. Once the long-term short circuit condition is resolved, a driver can recover without cycling the power to its input. An example of a long term short circuit would be the shorting of the control leads by, for example, a relay to indicate an emergency situation.

The system 300 includes a controller 308 that includes an I/O module configured to interface with one or more sensing units. As such, the occurrence of a long-term short circuit condition on the control leads 306 can be detected by the sensing units and subsequently communicated to the controller 308 to initiate the controlled cycling of the auxiliary power supply unit 304. Alternatively, the occurrence of a long-term short circuit condition on the control leads 306 may be directly detected by the controller 308 by way of monitoring a signal level on an internal/local port of the controller 308, where the signal is from one or both of the control leads 306.

The port may be configured as a voltage sensing node and electrically, optically or magnetically coupled to the external control leads in such a way as to sense the voltage thereon. A low reading sustained on the designated voltage sensing node for a predetermined time interval, would then be indicative of a long-term short circuit condition on the external control leads. Once the presence of a long-term short circuit condition has been established, the controller 308, which may be part of a larger driver assembly, may proceed in accordance to the method 100 and according to the timing diagram 200.

The system 300 further includes signal conditioning circuitry such as the current limit circuit 312 for overcurrent/thermal protection of, for example, LED loads and a level shift circuit 314 for level-shifting a sense signal to the controller 308 reference level (so that the sense signal may operatively interface with the controller 308. The level shift circuit 314 may also perform signal isolation functionality to, for example, separate high side drive voltage from low side drive voltage.

The switching circuit 302 may include a switch 311 (i.e., an active electronic switch such as a power transistor) operationally driven by the controller 308. The switch 311 may be a mechanical relay, in other embodiments. The switching circuit 302 is connected to the auxiliary power supply unit 304 and to an external control lead such that the duty cycle of the auxiliary power supplied to a load circuitry connected to the control leads 306 may be controlled by the controller 308. It should be noted that, in some embodiments, the controller 308 and the switching circuit 302 may be monolithically integrated into a single semiconductor substrate or a single semiconductor material.

An auxiliary power supply delivery control system, such as the exemplary system 300 may include, in addition to a switching circuit and controller unit, a plurality of signal conditioning and processing components. For the sake of illustration, the switching circuit and controller unit may be functionally represented by a switching controller subsystem. The schematic illustration in FIG. 4 illustrates an exemplary embodiment of a switching controller subsystem that may be implemented as part of a larger auxiliary power supply delivery control system.

Figure 4:
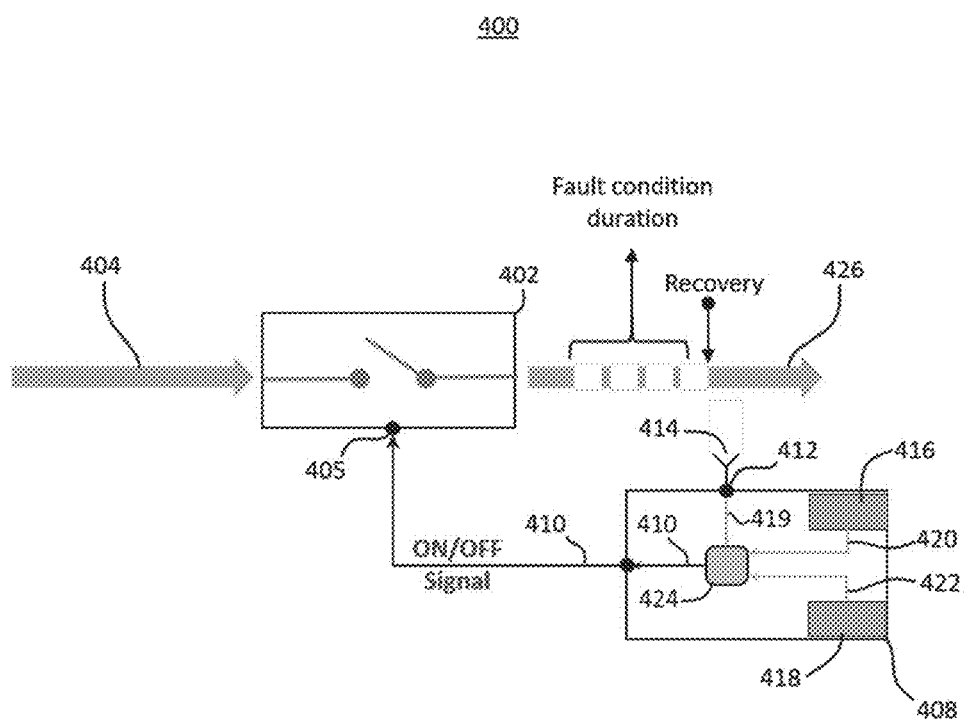
FIG. 4 illustrates a schematic block diagram of a switching controller in accordance with several aspects described herein.

FIG. 4 shows a switching controller subsystem 400 illustrated that includes switching circuit 402 disposed in between an input power signal 404, supplied by the auxiliary power supply unit 304, and one or more elements for which the auxiliary power is intended to be applied such as, for example, load circuitry connected to the control leads 306. The switching circuit 402 includes an input terminal 405 configured to receive a control signal 410 from the controller unit 408 and configured to control the circuit 402.

The control signal 410 may be considered, in a non-limiting way, as an ON/OFF signal. The ON state activates/enables the switching circuit 402 to allow signal propagation through the switching circuit 402, and may be represented by a logic high voltage level. The OFF state deactivates/disables the switching circuit 402 to prevent signal propagation through the switching circuit 402, and may be represented by a logic low level.

Furthermore, the controller unit 408 includes a terminal 412 configured to sense a voltage level on the external control leads through for example an electrical coupling mechanism 414. Controller unit 408 further includes a timing unit 416 for tracking duration of a fault condition detected on terminal 412.

A fault condition, such as a long-term short circuit, may be characterized by detection of a threshold level on terminal 412. Such fault condition may correspond to an emergency situation and would require a shutdown of the auxiliary power supply or temporary interruption in delivery of auxiliary power to one or more intended targets.

The controller unit 408 further includes a timing unit 418 for tracking the interruption period (off time) of auxiliary power (i.e., the delay in resumption of the auxiliary power delivery). The interruption in the delivery of the auxiliary power and resumption of the same is accomplished by the switching action of the switching circuit 402 and is operationally controlled by the controller unit 408 in accordance to the method 100.

During operation, the timing unit 416 may track an interval of time during which a threshold voltage level indicating a fault condition, is detected on terminal 412 of the controller unit 408. For example, detection of a low voltage level below a prescribed threshold on terminal 412 indicates a short circuit condition on, for example, the external control leads coupled to one or more load circuitry. The predetermined length of time for which a fault condition such as a short circuit/low voltage indication to be present before the fault condition is identified as an emergency situation (long-term fault condition) may be referred to as the threshold fault time or $t_{threshold}$.

Therefore, a low voltage detection event in combination with expiration of the threshold fault time, as tracked by timing unit 416, indicate a long-term short circuit condition on the control leads 306, which amounts to an emergency situation necessitating an auxiliary power shutdown/interruption. The auxiliary power shutdown/interruption is accomplished by toggling the control signal 410 to an OFF state which disables the switching circuit 402 and interrupts the supply of auxiliary power.

The auxiliary power remains off for a predetermined length of time tracked by the timing unit 418 of the controller unit 408. For the purposes of the present invention, the predetermined time delay in resumption of the auxiliary power delivery may be interchangeably referred to as the Off Time or $t_{off}$.

Upon expiration of the Off Time, as tracked by the timing unit 418, the control signal 410 is driven high to enable the switching circuit 402 and restore the auxiliary power. If a combined assessment of the reported value from the timing unit 416 and the voltage level on terminal 412 of the controller unit is no longer indicative of an emergency situation (long-term short circuit), the control signal 410 remains high in order to keep the auxiliary power supply switched on. Otherwise, the control signal 410 is driven low for a period of time corresponding to the predetermined time delay and the power supply is disabled for the length of time corresponding to the predetermined time delay. The described operation is repeated until the emergency situation is resolved.

The magnitude of the $t_{off}$ parameter may be selected to facilitate optimization of one or more metrics, such as reduction of power consumption during the emergency situation, improvement of driver reliability and efficiency and enablement of fast recovery from the emergency situation without a power cycle to the input leads of the driver.

The activation/deactivation profile of the control signal 410 may be a function of voltage level 419 on terminal 412, tracked time output value 420 of the timing unit 416 and the tracked time output value 422 of the timing unit 418. Therefore activation/deactivation of the control signal 410 is based on a combined assessment of the parameters (419, 420 and 416) as illustrated by the control signal activation unit of the controller unit 408 in FIG. 4.

Timing units 416, 418 and the control signal activation unit 424 are included for illustration purposes; these units may be implemented entirely in software, hardware or a combination thereof. The modified auxiliary power signal 426 leads to reduced power consumption and thermal loading characteristics, in addition to an auto recovery feature.

Generally, the present disclosure provides example systems, methods, apparatuses, controllers, processors, and computer-readable methods that may be used to perform the various functions, tasks, and operations described above. For example, one embodiment may be a system for limiting power consumption from an auxiliary power supply. The system may include a switching circuit connected to an auxiliary power supply and an output terminal. The system may further include a sensing module configured to identify a condition in the system and a controller that is configured to toggle the switching circuit in accordance with an output of the sensing module and a time threshold.

The condition may be a fault, such as a short circuit, that persists for a specified length of time. The short circuit can correspond to the electrical shorting of one or more control leads, which may or may not be external to the system. For instance, the short circuit may be defined by a voltage level that falls below a voltage threshold. One of ordinary skill in the art will readily recognize that other means of defining a short circuit condition may be used without departing from the teachings disclosed here. For example, a short circuit condition may be defined as a transient current exceeding a current threshold.

In some protocols where a short circuit is part of a communication protocol, the system may toggle the switching unit when the short circuit exceeds a predetermined time threshold. For example, the time threshold may be the time that is naturally mandated by the protocol for a short circuit. An example such protocol is the DALI protocol. However, the teachings described herein apply broadly to other protocols in which a fault condition may be an inherent part of communication.

The time threshold may be specified by a user or a control system that is configured to optimize power consumption and/or thermal loading. Furthermore, the auxiliary power supply may be an on-board power supply, such as for example, one or more batteries.

Another embodiment can be a method that may be executed by the above-mentioned system. For example, the method may be used to limit power consumption from an auxiliary power supply during a long-term electrical fault condition. The method may include detecting an electrical fault condition on a control lead. The method may further include disabling the auxiliary power supply when the electrical fault condition remains for a first length of time. The method includes enabling the auxiliary power supply after a second length of time and verifying a presence of the electrical fault condition. The method may include instructing a system to keep the auxiliary power supply enabled when the electrical fault condition is no longer detected.

The first length of time may correspond to a length of time that must expire before a detected electrical fault condition is classified as a long-term electrical fault condition. Furthermore, detecting the electrical fault condition may generally be applied on one control or more than one control lead of the system.

Another embodiment can be a method for automatically restoring a system's auxiliary power supply upon a resolution of a long-term electrical fault condition. The method may include detecting a long-term electrical fault condition and cycling the auxiliary power supply periodically during the long-term electrical fault condition. The period of the cycling may be a predetermined value. Furthermore, the method can include ceasing the cycling once the long-term fault condition is no longer detected, such that the auxiliary power supply remains in an enabled state.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method for limiting power consumption from an auxiliary power supply during a long-term electrical fault condition, the method comprising:
    detecting an electrical fault condition on one or more external control leads;
    disabling the auxiliary power supply if the electrical fault condition is present for a first length of time;

enabling the auxiliary power supply after a second length of time and verifying a presence of the electrical fault condition, wherein the auxiliary power supply remains enabled if the electrical fault condition is no longer detected; and repeating the detecting, disabling, and enabling when the presence of the electrical fault condition is confirmed.

2. The method of claim 1, wherein the first length of time corresponds to the length of time that must expire before a detected electrical fault condition is classified as long term electrical fault condition.

3. The method of claim 1, wherein detecting the electrical fault condition on the one or more external control leads corresponds to detecting a short circuit condition on the one or more external control leads.

4. The method of claim 3, wherein detecting the short circuit condition on the one or more control leads corresponds to detecting a low voltage on the one or more external control leads.

5. The method of claim 1, wherein the second length of time is statically defined by a user based on optimizing power consumption and thermal performance.

6. The method of claim 1, wherein the second length of time is dynamically determined by a system controller based on optimizing power consumption and thermal performance.

7. The method of claim 1, wherein, the auxiliary power supply corresponds to an onboard power supply.

8. A method for automatic restoration of a system auxiliary power supply upon resolution of a long-term electrical fault condition, the method comprising;

detecting a long-term electrical fault condition;

cycling the auxiliary power supply periodically during the long-term electrical fault condition, wherein the period of the cycling is a predetermined value;

ceasing the cycling once the long-term fault condition is no longer detected, such that the auxiliary power supply remains in an enabled state.

9. The method of claim 8, wherein detecting the long-term fault condition corresponds to detecting a long-term short circuit condition on one or more external control leads.

10. The method of claim 9, wherein detecting the long-term short circuit condition corresponds to detecting a long-term low voltage condition on the one or more external control leads.

11. The method of claim 8, wherein the predetermined value is calculated for optimizing power consumption and thermal performance.

12. The method of claim 8, wherein the auxiliary power supply corresponds to an onboard power supply.

13. A system for limiting power consumption from an auxiliary power supply during a long-term electrical fault condition, the system comprising:

an auxiliary power supply;

a switching circuit configured to selectively enable and disable the auxiliary power supply upon receipt of a control signal from a controller;

the controller including a sensing module configured to detect an electrical fault condition on one or more external control leads; and the controller configured to provide a control signal to the switching circuit to (i) disable the auxiliary power supply if the electrical fault condition is present for a first length of time and to (ii) provide a further control signal to the switching circuit to enable the auxiliary power supply after a second length of time and verify a presence of the electrical fault condition, wherein the auxiliary power supply remains enabled if the electrical fault condition is no longer detected, and (iii) repeat the detecting, disabling and enabling when the presence of the electrical fault condition is confirmed.

14. The system of claim 13 wherein the electrical fault condition corresponds to a fault that persists for a specified length of time.

15. The system of claim 14, wherein the fault corresponds to a short circuit condition on one or more external control leads.

16. The system of claim 15, wherein the short circuit condition corresponds to a low voltage condition on the one or more external control leads.

17. The system of claim 13 wherein the auxiliary power supply corresponds to an onboard power supply.

18. The system of claim 17 wherein, the onboard power supply corresponds to one or more batteries.

* * * * *